US009802331B1

(12) United States Patent
Hall, Jr. et al.

(10) Patent No.: US 9,802,331 B1
(45) Date of Patent: Oct. 31, 2017

(54) CUTTING GUIDE

(71) Applicants: Curtis L. Hall, Jr., Moncks Corner, SC (US); Neil A. Alexander, Edisto Island, SC (US); Jeffrey L. Sherman, Pinopolis, SC (US); Emily C. Mikkelson, Hanahan, SC (US)

(72) Inventors: Curtis L. Hall, Jr., Moncks Corner, SC (US); Neil A. Alexander, Edisto Island, SC (US); Jeffrey L. Sherman, Pinopolis, SC (US); Emily C. Mikkelson, Hanahan, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/223,904

(22) Filed: Jul. 29, 2016

(51) Int. Cl.
| | |
|---|---|
| *B26D 7/00* | (2006.01) |
| *B23B 47/28* | (2006.01) |
| *B23B 49/02* | (2006.01) |
| *B23Q 11/00* | (2006.01) |
| *B23C 1/20* | (2006.01) |

(52) U.S. Cl.
CPC ............ *B26D 7/0006* (2013.01); *B23B 47/28* (2013.01); *B23B 49/026* (2013.01); *B23B 2247/00* (2013.01); *B23C 1/20* (2013.01); *B23Q 11/0046* (2013.01)

(58) Field of Classification Search
CPC . Y10T 409/306216; Y10T 409/306384; Y10T 409/30644; Y10T 409/306552; Y10T 408/55; Y10T 408/567; Y10T 408/568; Y10T 408/569; Y10T 408/556; Y10T 408/5565; B23C 1/20; B23B 49/02; B23B 49/026; B23B 47/28; B23B 47/287; B23B 2247/00; B23Q 11/0046
See application file for complete search history.

(56) References Cited

U.S. PATENT DOCUMENTS

| | | | | |
|---|---|---|---|---|
| 3,022,806 A | * | 2/1962 | Johnston | ............ B23Q 11/0046 144/252.1 |
| 3,587,391 A | * | 6/1971 | Pitts | .......................... B23Q 1/40 269/267 |

(Continued)

FOREIGN PATENT DOCUMENTS

| | | | |
|---|---|---|---|
| CH | DE 3733534 A1 * | 4/1989 | ............ B23Q 3/002 |
| DE | 4122948 A1 | 1/1993 | |

(Continued)

OTHER PUBLICATIONS

"Ball Rollers/Plunger Type/Press Fit," MISUMI Corporation, South East Asia, <http://sg.misumi-ec.com/vona2/detail/110300427210/>, received Dec. 21, 2016, 3 pages.

(Continued)

*Primary Examiner* — Sunil K Singh
*Assistant Examiner* — Yasir Diab
(74) *Attorney, Agent, or Firm* — Toler Law Group, PC

(57) ABSTRACT

An apparatus includes a base defining at least one through-hole configured to receive a cutter. The apparatus further includes a plurality of substantially aligned retractable rollers disposed at least partially within a plurality of recesses of the base. Each roller of the plurality of substantially aligned retractable rollers is retractable in a direction normal to a surface of the base.

20 Claims, 15 Drawing Sheets

(56) References Cited

U.S. PATENT DOCUMENTS

| | | | | |
|---|---|---|---|---|
| 4,108,564 | A | * | 8/1978 | Peddinghaus ......... B23B 41/003 408/10 |
| 4,251,174 | A | * | 2/1981 | Satler .................. B23C 1/06 144/135.2 |
| 5,323,867 | A | * | 6/1994 | Griffin .................. B25J 5/007 180/22 |
| 6,129,489 | A | * | 10/2000 | Linderholm ....... B23K 37/0217 408/76 |
| 6,296,426 | B1 | * | 10/2001 | King .................. B23B 49/026 408/76 |
| 6,926,094 | B2 | * | 8/2005 | Arntson .................. B23B 39/18 173/31 |
| 9,352,435 | B2 | * | 5/2016 | Spishak .................. B25J 5/007 |
| 2003/0108395 | A1 | * | 6/2003 | Douglas .................. B23Q 9/02 408/76 |
| 2004/0265081 | A1 | * | 12/2004 | Buttrick, Jr. ............ B23B 35/00 408/76 |
| 2007/0178815 | A1 | * | 8/2007 | Buser .................. B24B 55/102 451/451 |
| 2010/0285729 | A1 | * | 11/2010 | Loveless ................. B24B 55/04 451/456 |

FOREIGN PATENT DOCUMENTS

| | | | |
|---|---|---|---|
| JP | 03228541 A | * | 10/1991 |
| JP | 2009000801 A | * | 1/2009 |

OTHER PUBLICATIONS

"Dustmuzzle Blog," Dust Collection Products, Shave Away, Europe, <http://wwvv.dustmuzzle.com/blog/>, received on Dec. 21, 2016, 44 pages.

"ESD Roller Track," Apex Industrial Supply,SKU: ER-40B-4-bk / EF-6045ESD, <http://www.apexindustrialsupply.com/esd-roller-track, received Dec. 21, 2016, 4 pages.

"Roller Plungers/Compact/Load Adjusting Function," MISUMI Corporation, Part No. CBPJ9, <http://uk.misumi-ec.com/vona2/detail/110302394550>, received Dec. 21, 2016, 4 pages.

* cited by examiner

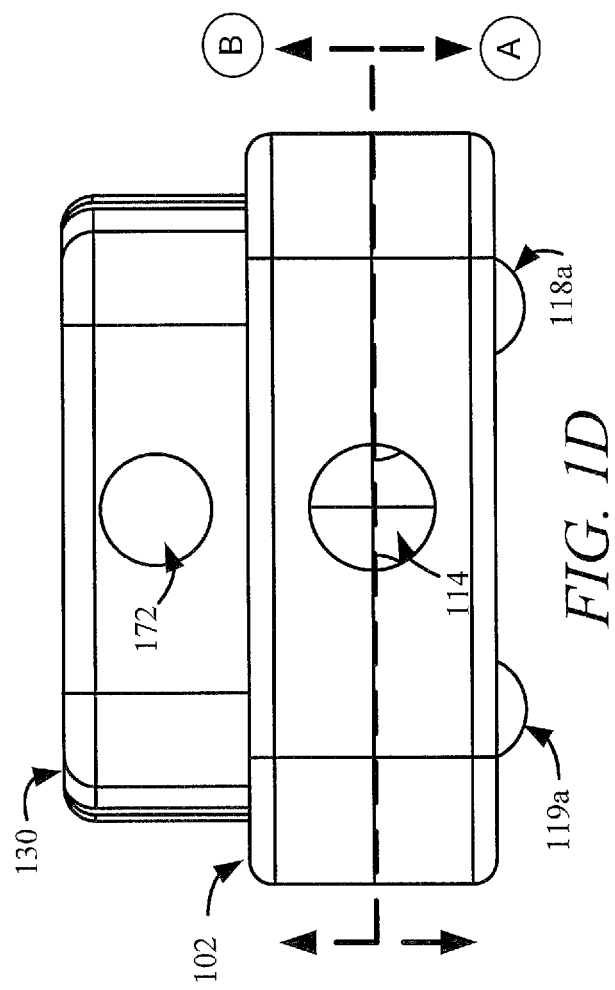

CUTTING GUIDE

FIELD OF THE DISCLOSURE

The present disclosure relates to cutting guides.

BACKGROUND

Cutting guides may be used to guide a cutter during movement of the cutting guide along a surface of a workpiece. When the cutting guide encounters a contour change in the surface of the workpiece, the cutting guide may lose contact with the workpiece, resulting in a non-uniform cut.

SUMMARY

In a particular implementation, an apparatus includes a base defining at least one through-hole to receive a cutter. The apparatus further includes a plurality of substantially aligned retractable rollers disposed at least partially within a plurality of recesses of the base. Each of the rollers is retractable in a direction normal to a surface of the base.

In another particular implementation, a method is performed during movement of a cutting guide that includes a base defining at least one through-hole configured to receive a cutter and that includes a plurality of substantially aligned independently retractable rollers that are retractable in a direction normal to a surface of the base. The method includes retracting a first roller of the plurality of substantially aligned independently retractable rollers at a first cutting location. The method further includes retracting a second roller of the plurality of substantially aligned independently retractable rollers at a second cutting location.

In another particular implementation, an apparatus includes a base including a vacuum manifold. The apparatus further includes a plurality of substantially aligned retractable rollers disposed at least partially within recesses of the base. Each roller of the plurality of substantially aligned retractable rollers is retractable in a direction normal to a surface of the base.

The features, functions, and advantages described herein can be achieved independently in various embodiments or may be combined in yet other embodiments, further details of which are disclosed with reference to the following description and drawings.

BRIEF DESCRIPTION OF THE DRAWINGS

FIG. 1D illustrates a front view of the cutting guide of FIG. 1A;

DETAILED DESCRIPTION

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Figure 1A:
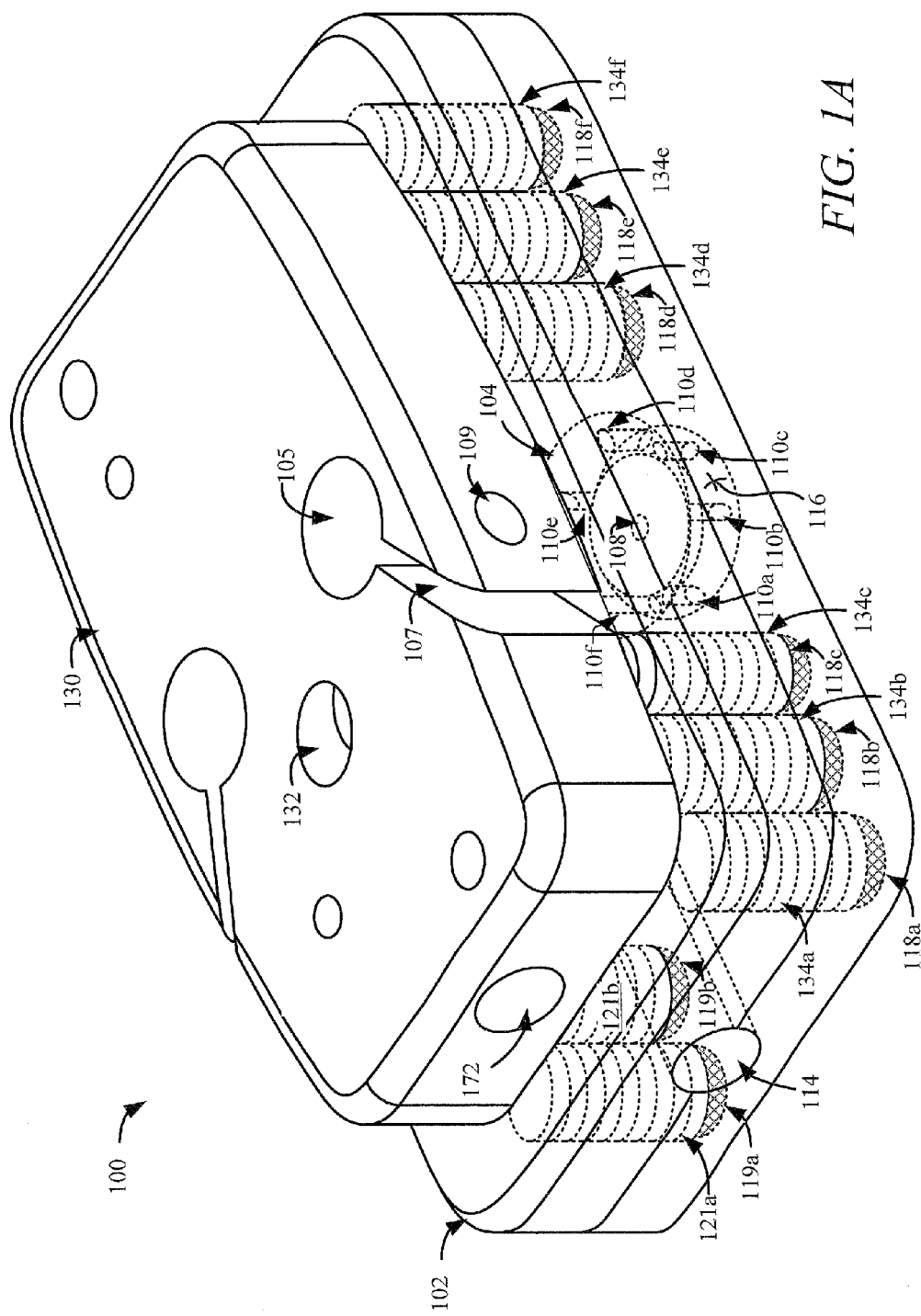
FIG. 1A illustrates an upper perspective view of a cutting guide.
Figure 1B:
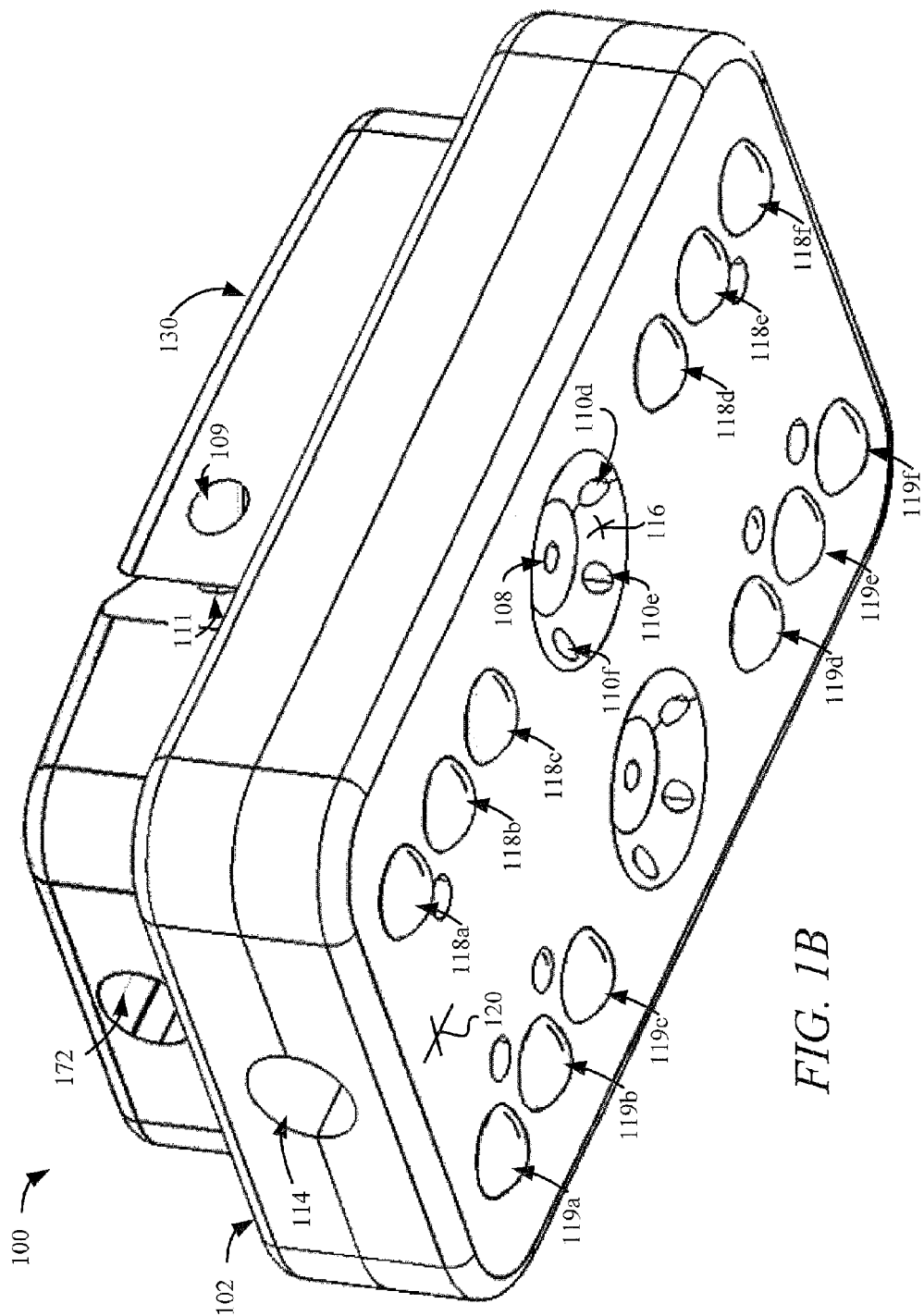
FIG. 1B illustrates a lower perspective view of the cutting guide of FIG. 1A.
Figure 1C:
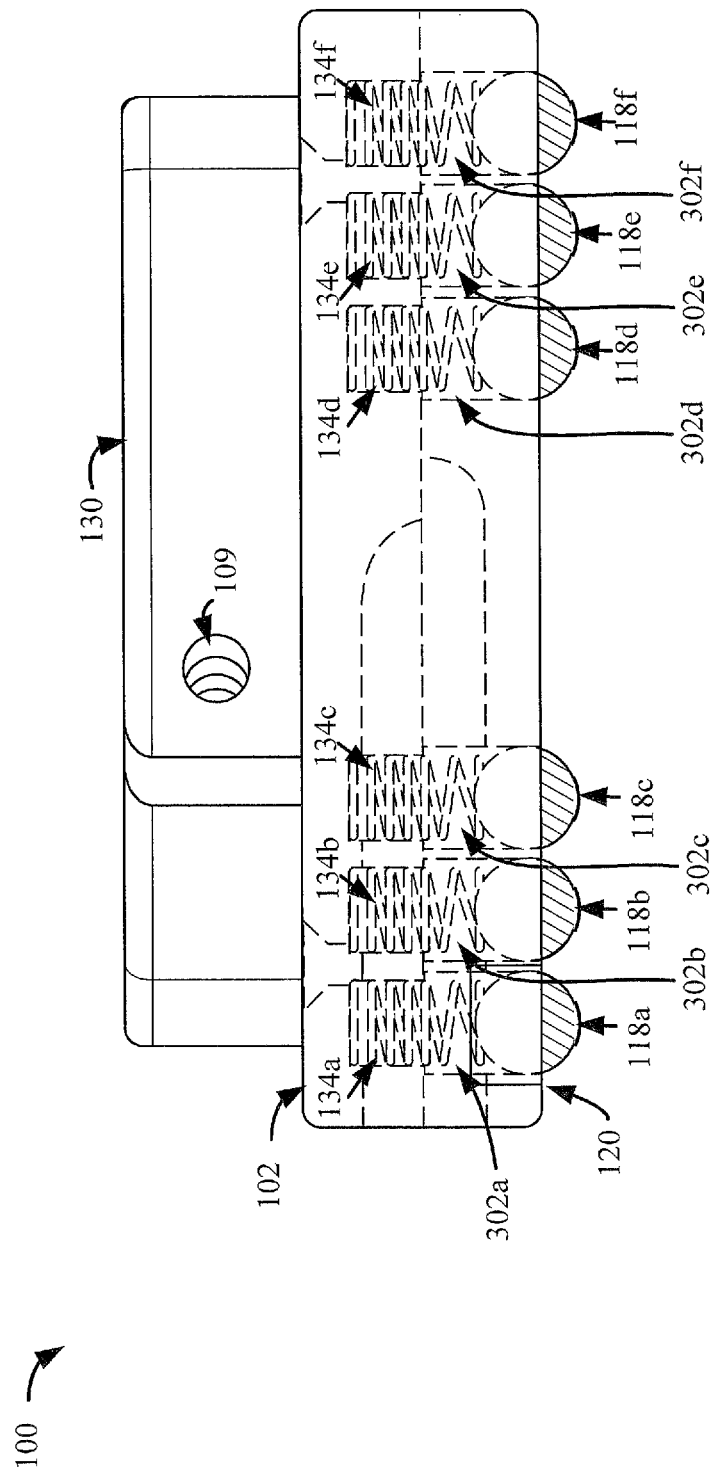
FIG. 1C illustrates a side view of the cutting guide of FIG. 1A.
Figure 1E:
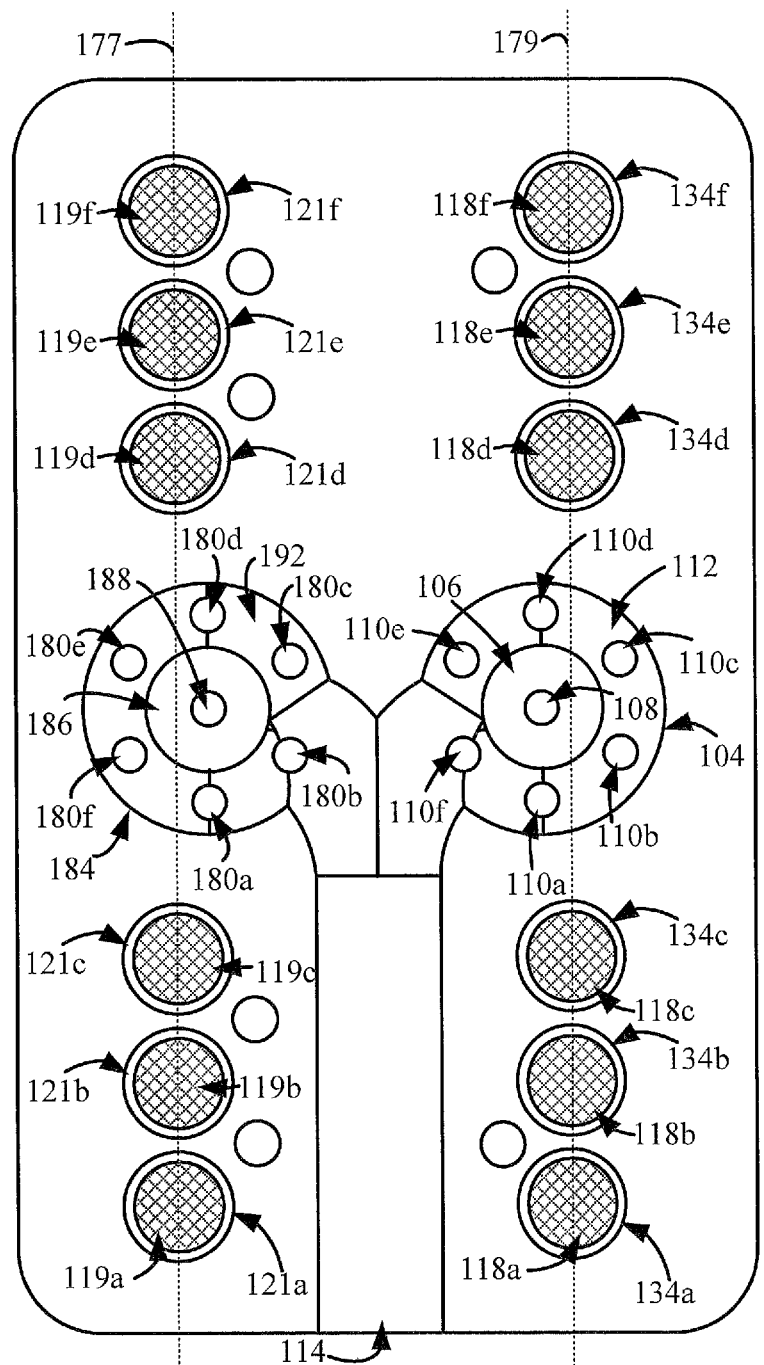
FIG. 1E illustrates a cross-sectional view of the cutting guide of FIG. 1A along the line A of FIG. 1D.
Figure 1F:
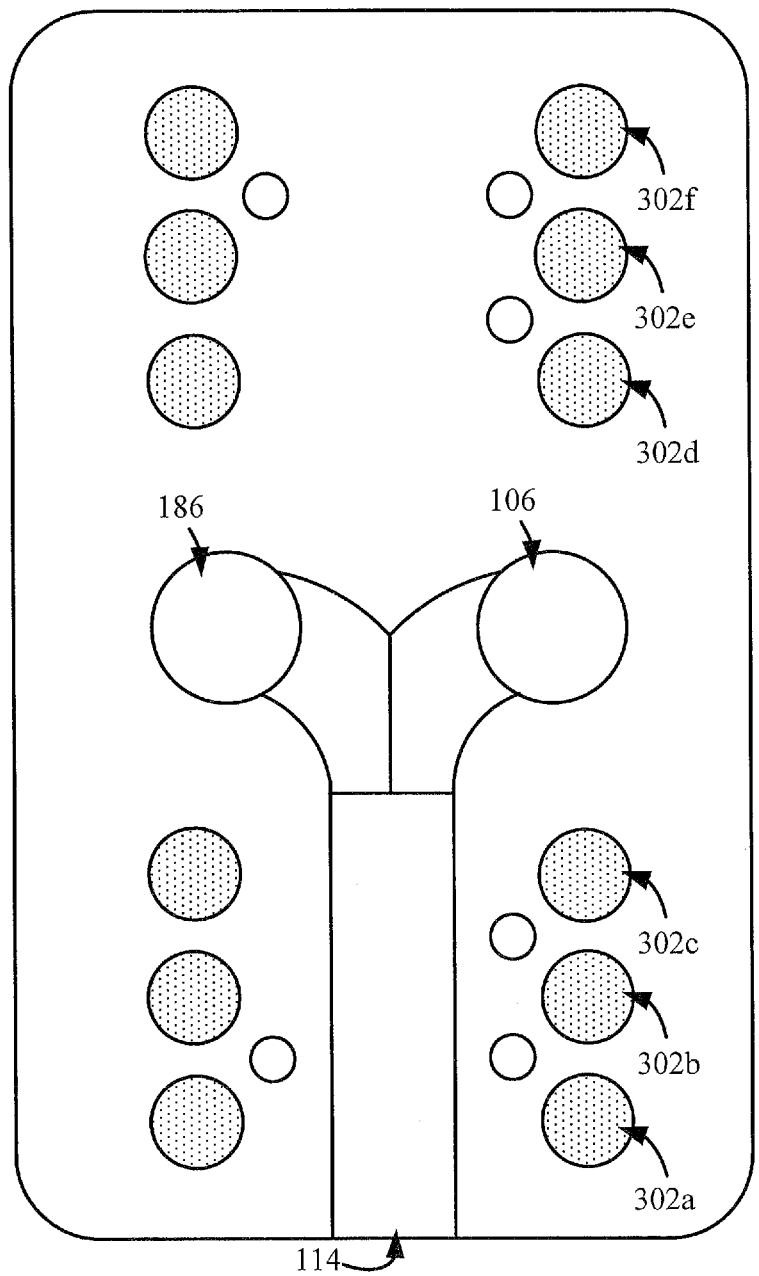
FIG. 1F illustrates a cross-sectional view of the cutting guide of FIG. 1A along the line B of FIG. 1E.

Referring to FIG. 1A, an upper perspective view (partially transparent to illustrate rollers, springs, and portions of a through-hole in a base 102) of a cutting guide 100 is illustrated. FIG. 1B illustrates a lower perspective view of the cutting guide 100 of FIG. 1A. FIG. 1C illustrates a side view (with the base 102 partially transparent to illustrate rollers, recesses, and springs of the cutting guide 100) of the cutting guide 100 of FIG. 1A. FIG. 1D illustrates a front view of the cutting guide 100 of FIG. 1A. FIG. 1E illustrates a cross-sectional view of the cutting guide 100 of FIG. 1D along line A of FIG. 1D. FIG. 1F illustrates a cross-sectional view of the cutting guide 100 of FIG. 1D along line B of FIG. 1D. FIG. 2A illustrates a top view of the base 102 of the cutting guide 100 of FIGS. 1A-1F, and FIG. 2B illustrates a cross-sectional view along line A of FIG. 2A.

Referring to FIGS. 1A, 1E, 2A, and 2B, the base 102 defines at least one through-hole 104. The through-hole 104 is configured (e.g., based on size and shape) to receive a cutter. The cutter may include a cutter housing and a cutting element. In some examples, the cutter housing houses a cutter motor, such as a router motor. In some examples, the cutting element is a bit, such as a rotary bit. An example of a cutter is described below with reference to FIG. 5.

The through-hole 104 includes a portion to receive the cutter housing and a portion through which the cutting element is configured to extend. For example, referring to FIGS. 2A and 2B, the through-hole 104 includes a portion 106 to receive the cutter housing and includes a portion 108 through which the cutting element is configured to extend. During operation, the cutting element that extends through the portion 108 cuts portions of a workpiece, thereby creating cutting by-products (e.g., dust or chips from a workpiece).

Figure 2B:
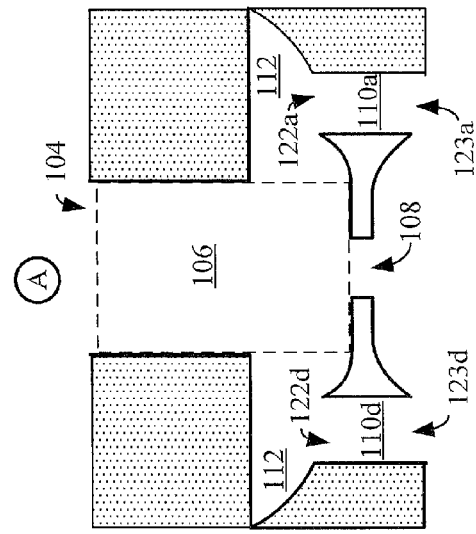
FIG. 2B illustrates a cross-sectional view along line A of FIG. 2A.
Figure 2A:
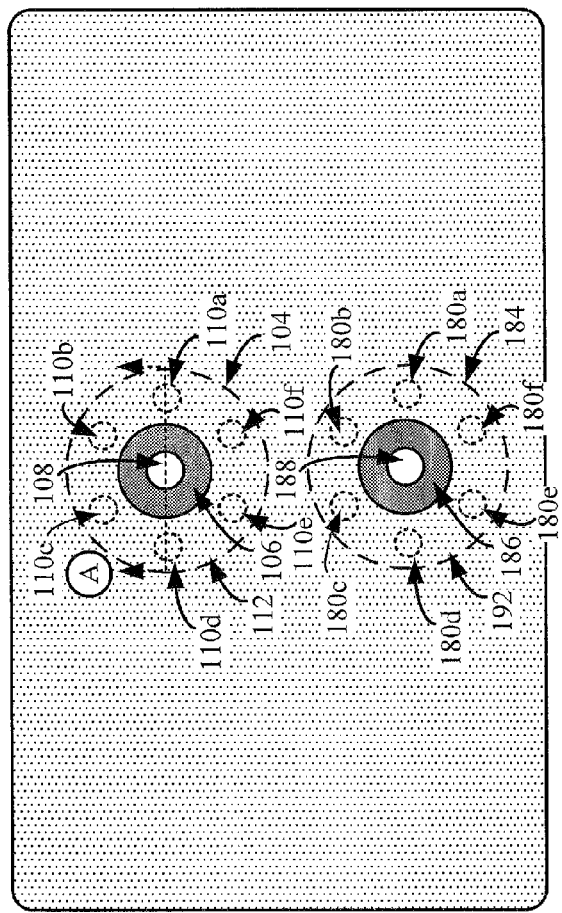
FIG. 2A illustrates top view of a base of the cutting guide of FIG. 1A.

The base 102 may define, include, or be configured to function as, part of a vacuum manifold that includes ports (e.g., vacuum ports) 110a, 110b, 110c, 110d, 110e, and 110f of FIGS. 1A, 1E, and 2A; a manifold portion 112 of FIGS. 1E, 2A, and 2B; and a routing port 114 of FIGS. 1A-1F. The routing port 114 may extend through the base 102 to the manifold portion 112, which is coupled to the ports 110a, 110b, 110c, 110d, 110e, and 110f. Thus, the ports 110a, 110b, 110e, 110d, 110e, and 110f may be coupled to the routing port 114. In some implementations, the through-hole 104 includes the ports 110a, 110b, 110c, 110d, 110e, and 110f of FIGS. 1A, 1E, and 2A and the manifold portion 112 of FIGS. 1E, 2A, and 2B. In other implementations, the manifold portion 112 and one or more of the ports 110a, 110b, 110c, 110d, 110e, and 110f may be separated from the portion 106 and thus may be formed in a through-hole that is separated from the through-hole that includes the portion 106.

The base 102 includes a recessed surface in which the ports 110a, 110b, 110c, 110d, 110e, and 110f are formed. For example, the base 102 includes a recessed surface 116 as shown in FIGS. 1A and 1B. The ports 110a, 110b, 110c, 110d, 110e, and 110f are formed in or through (or include an end defined by) the recessed surface 116. Thus, the ports 110a, 110b, 110c, 110d, 110e, and 110f are recessed ports. The portion 108 is also formed in or through (or includes an end defined by) the recessed surface 116 and is proximate to the ports 110a, 110b, 110c, 110d, 110e, and 110f. As described above, during operation, the cutting element extends through the portion 108. Thus, during operation, the ports 110a, 110b, 110c, 110d, 110e, and 110f are proximate to the cutting element.

The ports 110a, 110b, 110c, 110d, 110e, and 110f include a first end proximate to the recessed surface 116 and a second end proximate to the manifold portion 112. To illustrate, referring to FIG. 2B, the port 110d includes a first end 123d proximate to the recessed surface 116 and a second end 122d proximate to the manifold portion 112. As another example, the port 110a includes a first end 123a proximate to the recessed surface 116 and a second end 122a proximate to the manifold portion 112. The ports 110a, 110b, 110c, 110d, 110e, and 110f thus expose the manifold portion 112 to an ambient environment proximate to the recessed surface 116. During operation, cutting by-products enter (e.g., are vacuumed into) the ports 110a, 110b, 110c, 110d, 110e, and 110f through the first end of the ports, travel through the ports 110a, 110b, 110c, 110d, 110e, and 110f to the manifold portion 112, travel through the manifold portion 112 to the routing port 114, and travel through the routing port 114 and out of the base 102 (e.g., to a vacuum collector).

Thus, the base 102 may include a plurality of recessed vacuum ports (e.g., the ports 110a, 110b, 110c, 110d, 110e, and 110f) proximate to a portion 108 of a through-hole through which a cutting element extends during operation of the cutting guide. Locating the ports 110a, 110b, 110c, 110d, 110e, and 110f proximate to (e.g., in a same recessed surface 116 as) the portion 108 enables the ports 110a, 110b, 110c, 110d, 110e, and 110f to be closer to cutting by-products generated by the cutting element than in systems that employ a separate vacuum hose to vacuum cutting by-products.

In some examples, the base 102 defines multiple cutter through-holes configured to receive multiple cutters. For example, referring to FIGS. 1E and 2A, the base 102 may define a second through-hole 184 configured to receive a second cutter. The second through-hole 184 has a portion 186 configured to retain a cutter housing of the second cutter similar to the portion 106; a manifold portion 192 similar to the manifold portion 112; a portion 188 through which a cutting element of the second cutter is configured to extend similar to the portion 108; and ports 180a, 180b, 180c, 180d, 180e, and 180f similar to the ports 110a, 110b, 110c, 110d, 110e, and 110f. Although the figures show a base 102 configured to receive two cutters, in other implementations the base 102 may include more than or less than two through-holes to receive more than or less than two cutters.

The cutting guide 100 further includes a plurality of substantially aligned retractable rollers. In some examples, the plurality of substantially aligned retractable rollers includes at least three rollers. For example, referring to FIGS. 1A-1E, the cutting guide 100 includes a plurality of retractable rollers (e.g., a plurality of substantially aligned retractable rollers) 118a, 118b, 118c, 118d, 118e, and 118f. The plurality of retractable rollers 118a, 118b, 118c, 118d, 118e, and 118f is aligned along a line 179 of FIG. 1E within manufacturing tolerances (e.g., are substantially aligned). In some examples, the through-hole 104 may be located between at least two rollers of the plurality of retractable rollers 118a, 118b, 118c, 118d, 118e, and 118f. For example, the portion 106 of the through-hole 104 is located between the roller 118d and the roller 118c.

In some examples, the plurality of retractable rollers 118a, 118b, 118c, 118d, 118e, and 118f are spherical rollers (e.g., such as ball bearings). In other examples, the plurality of retractable rollers 118a, 118b, 118c, 118d, 118e, and 118f may have a non-spherical shape. In some examples, the plurality of retractable rollers 118a, 118b, 118c, 118d, 118e, and 118f are formed of or include metal, plastic, or a combination thereof. Referring to FIG. 1C, each roller of the plurality of retractable rollers 118a, 118b, 118c, 118d, 118e, and 118f is retractable (independent of the other rollers) in a direction substantially normal to a surface 120 of the base 102 (e.g., each roller is retractable into its associated recess).

As described in more detail below with reference to FIGS. 4A-4E, during operation, the cutting guide 100 moves along a surface of a workpiece. When the cutting guide 100 moves along the surface of the workpiece, the surface 120 contacts the surface of the workpiece. The retractable nature of the rollers enables the surface 120 of the base 102 to maintain contact with the surface of the workpiece despite encountering contour changes in the workpiece. For example, as described in more detail below with reference to FIGS. 4A-4E, the cutting guide 100 may encounter a contour change, such as a step or bump, when the cutting guide 100 moves along the surface of the workpiece. The independently retractable nature of the rollers enables each roller to retract independently of the other rollers in response to the roller encountering the contour change. Retracting the roller in response to the contour change enables the surface 120 of the base 102 to maintain contact with the surface of the workpiece.

The surface 120 of the base 102 may be formed of material having a low coefficient of friction to reduce or limit a friction force between the surface of the workpiece and the surface 120 of the base 102 when the cutting guide 100 moves along the surface of the workpiece (e.g., during operation of the cutting guide 100). In some examples, the surface 120 of the base 102 is formed of or includes polyethylene.

The plurality of retractable rollers 118a, 118b, 118c, 118d, 118e, and 118f are disposed at least partially within recesses. For example, referring to FIG. 1C, the plurality of retractable rollers 118a, 118b, 118c, 118d, 118e, and 118f are disposed within a plurality of recesses 302a, 302b, 302c, 302d, 302e and 302f, respectively, of the base 102. Each recess of the plurality of recesses 302a, 302b, 302c, 302d, 302e and 302f includes a tapered portion and includes a first portion that is dimensioned to receive a roller of the plurality of retractable rollers 118a, 118b, 118c, 118d, 118e, and 118f. The first portion has a cross-sectional dimension that is greater than a cross-sectional dimension of the roller. A first end of the tapered portion has a cross-sectional dimension less than the cross-sectional dimension of the roller. Thus, when the roller is disposed in its associated recess, only a portion of the roller is able to pass through the tapered portion. The tapered portion thereby serves to confine the roller within its associated recess by preventing the roller from passing through an open end of the recess.

Figure 3:
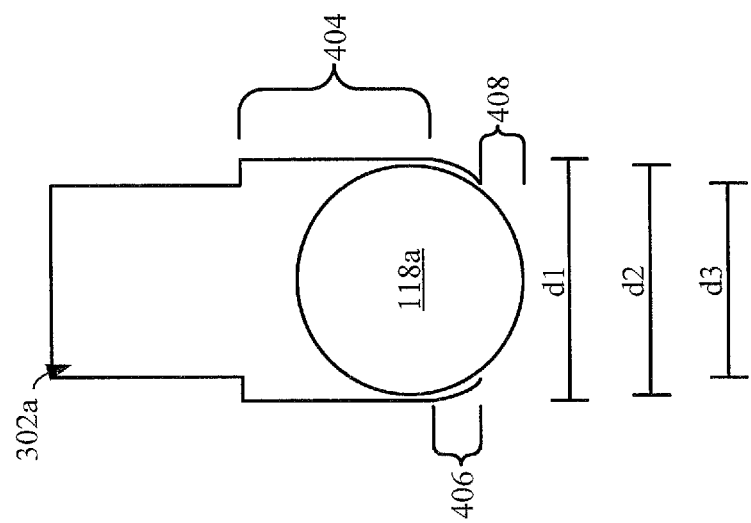
FIG. 3 illustrates an example of a recess in the cutting guide of FIG. 1A.

To illustrate, FIG. 3 illustrates an example of the recess 302a of FIG. 1C. The recess 302a includes a first portion 404 and a tapered portion 406. The first portion 404 has a cross-sectional dimension (e.g., a diameter) d1 that is greater than the cross-sectional dimension (e.g., the diameter) d2 of the roller 118a. Thus, the first portion 404 is dimensioned to receive the roller 118a and is dimensioned to enable at least a portion of the roller 118a to retract into the recess 302a.

The tapered portion 406 (e.g., the cross-sectional dimension d3) may be formed by or include a separate piece (e.g., a taper sleeve or nut) that is inserted into the recess 302a. The tapered portion 406 has a cross-sectional dimension (e.g., a diameter) d3 that is smaller than the cross-sectional dimension d2 of the roller 118a. Thus, only a portion 408 of the roller 118a is able to pass through the tapered portion 406. The tapered portion 406 thereby serves to confine the roller 118a within the recess 302a by preventing the roller 118a from passing through an open end of the recess 302a.

The cutting guide 100 includes a plurality of springs 134a, 134b, 134c, 134d, 134e, and 134f disposed within the plurality of recesses 302a, 302b, 302c, 302d, 302e and 302f, respectively. The springs 134a, 134b, 134c, 134d, 134e, and 134f are configured to exert a compression force on the plurality of retractable rollers 118a, 118b, 118c, 118d, 118e, and 118f while being compressible to allow for retraction of the plurality of retractable rollers 118a, 118b, 118c, 118d, 118e, and 118f into the recesses. The springs 134a, 134b, 134c, 134d, 134e, and 134f may apply force to the plurality of retractable rollers 118a, 118b, 118c, 118d, 118e, and 118f, respectively, in a direction normal to the surface 120, thereby opposing retraction of the plurality of retractable rollers 118a, 118b, 118c, 118d, 118e, and 118f and/or causing the plurality of retractable rollers 118a, 118b, 118c, 118d, 118e, and 118f to return to an un-retracted position upon relief of force applied in a direction normal to the surface 120 (toward the surface 120).

For example, as described in more detail below with reference to FIGS. 4A-4E, during operation (e.g., when the cutting guide 100 is moving along a surface of the workpiece), a roller of the plurality of rollers 118a, 118b, 118c, 118d, 118e, and 118f may encounter a contour change (e.g., a step or a bump) in the workpiece. The contour change in the workpiece may result in application of force (to the roller) that includes a component normal to and toward the surface 120. Application of the force to the roller may cause the spring associated with the roller to compress, enabling the roller to at least partially retract into its associated recess. Retraction of the roller enables the surface 120 of the base 102 to maintain contact with the surface of the workpiece despite encountering the contour change when the cutting guide 100 is moving along the surface of the workpiece.

Thus, the springs 134a, 134b, 134c, 134d, 134e, and 134f are compressible to enable retraction of the plurality of retractable rollers 118a, 118b, 118c, 118d, 118e, and 118f and additionally provide compression force to the plurality of retractable rollers 118a, 118b, 118c, 118d, 118e, and 118f to oppose retraction or return to un-retracted state.

The plurality of retractable rollers 118a, 118b, 118c, 118d, 118e, and 118f may be configured to interact with a groove or channel in a workpiece to guide movement of the cutting guide along the direction of the groove or channel. For example, during operation of the cutting guide 100 (e.g., when the cutting guide 100 is moving along the surface of the workpiece), absent a contour change, the plurality of retractable rollers 118a, 118b, 118c, 118d, 118e, and 118f may be configured to be disposed within a groove or channel of a workpiece to guide the movement of the cutting guide 100 in a direction parallel to the groove or channel. Upon encountering a contour change (e.g., a termination of the groove or channel or lessening of a dimension of the groove or channel that causes less of the roller to be able to fit within the groove or channel than the other rollers), one roller may at least partially retract independently of the other rollers to enable the surface 120 to maintain contact with the workpiece and to enable the other rollers to interact with (e.g., remain at least partially disposed within) the groove to provide directional guidance to the cutting guide 100 in a direction along the groove, as described in more detail below.

To illustrate, FIGS. 4A-4E illustrate various views of the cutting guide 100 and a first cutter 496 and a second cutter 498 while the cutting guide 100 is located on a workpiece 420 and cutting or moving along a direction 430. In some examples, the workpiece 420 includes a carbon or composite panel. In some examples, the carbon or composite panel is used in an aerospace application. For example, the carbon or composite panel may be used to form a fuselage or wing structure of an aircraft.

The direction 430 may correspond to a direction parallel to a groove (or channel) 416 in the workpiece 420 and/or may be parallel to the plurality of retractable rollers 118a, 118b, 118c, 118d, 118e, and 118f and/or a second plurality of retractable rollers (e.g., a second plurality of substantially aligned retractable rollers) 119a, 119b, 119c, 119d, 119e, and 119f. The groove 416 includes a surface 425 (e.g., a bottom surface) and a surface 423 (e.g., a first side surface) and a surface 499 (e.g., a second side surface).

The first cutter 496 includes a cutting element 492 and the second cutter 498 includes a cutting element 494. During operation of the cutting guide 100, the first cutter 496 may be disposed within the portion 106 of the through-hole 104 of FIGS. 1A and 2E such that the cutting element 492 extends through the portion 108. The first cutter 496 may generate, form, or produce a cut 426 of the workpiece 420 as the cutting guide 100 moves in the direction 430 along the groove 416. Additionally or alternatively, a second cutter 498 may be disposed within the portion 186 of the through-hole 184 of FIGS. 1E and 2A such that the cutting element 494 extends through the portion 188. The second cutter 498 may generate, form, or produce a cut 428 of the workpiece 420 as the cutting guide 100 moves in the direction 430 along the groove 422

Figure 4A:
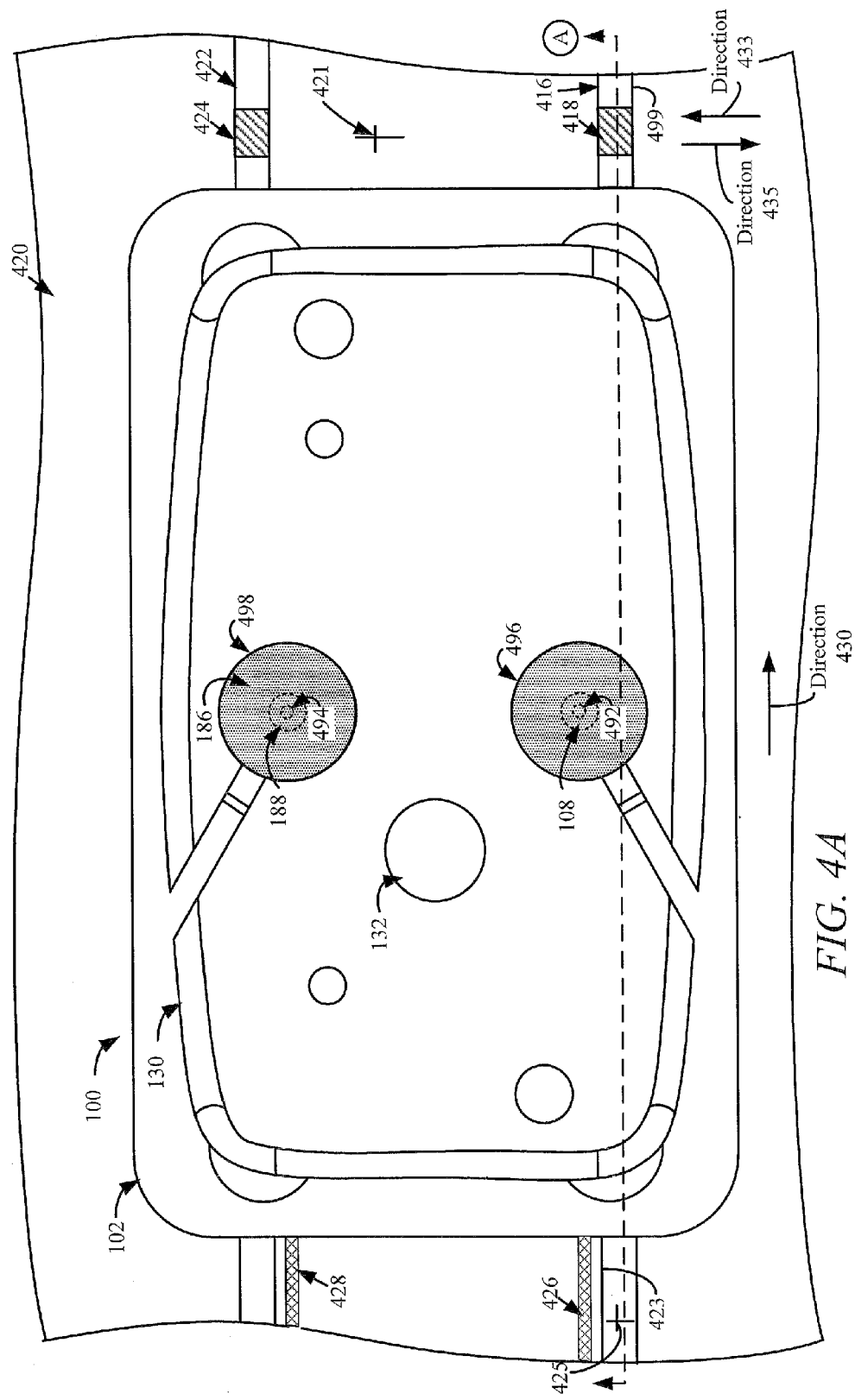
FIG. 4A illustrates a top view of an example of the cutting guide of FIG. 1A disposed at a first cutting location on a workpiece that includes grooves.
Figure 4B:
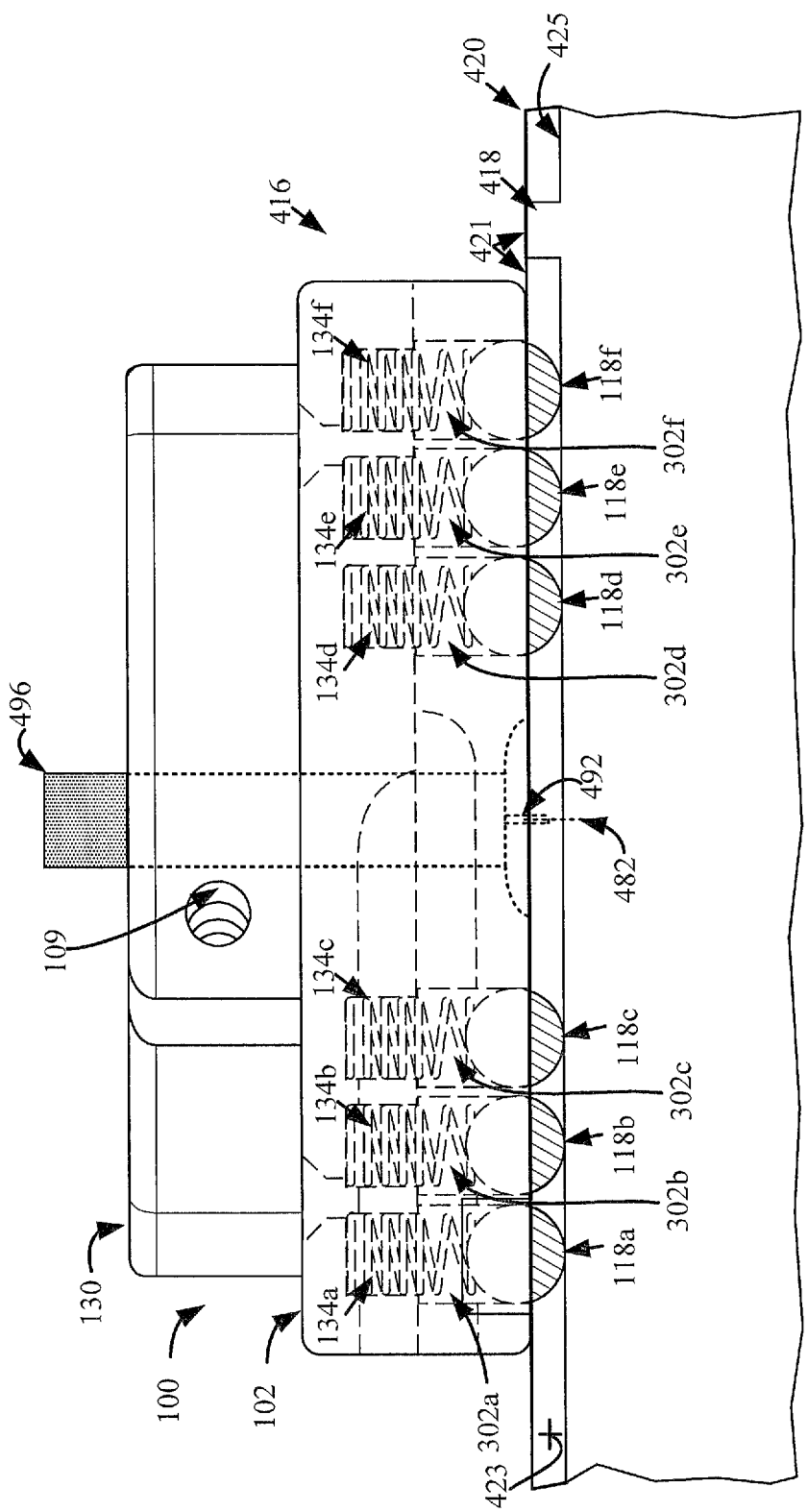
FIG. 4B illustrates a side view of the cutting guide of FIG. 1A disposed at the first cutting location on the workpiece of FIG. 4A.
Figure 4C:
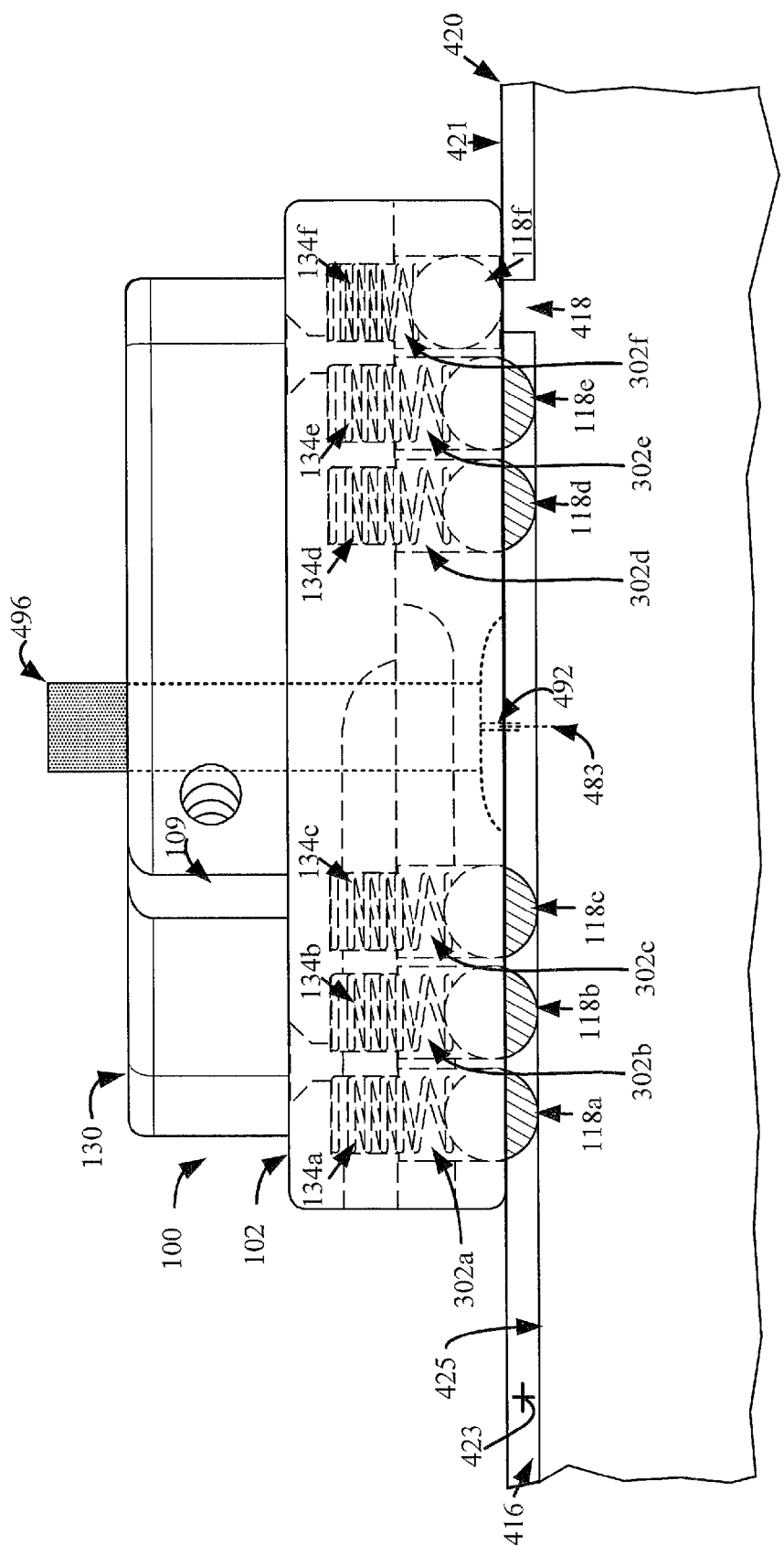
FIG. 4C illustrates a side view of the cutting guide of FIG. 1A disposed at a second cutting location on the workpiece of FIG. 4A.
Figure 4D:
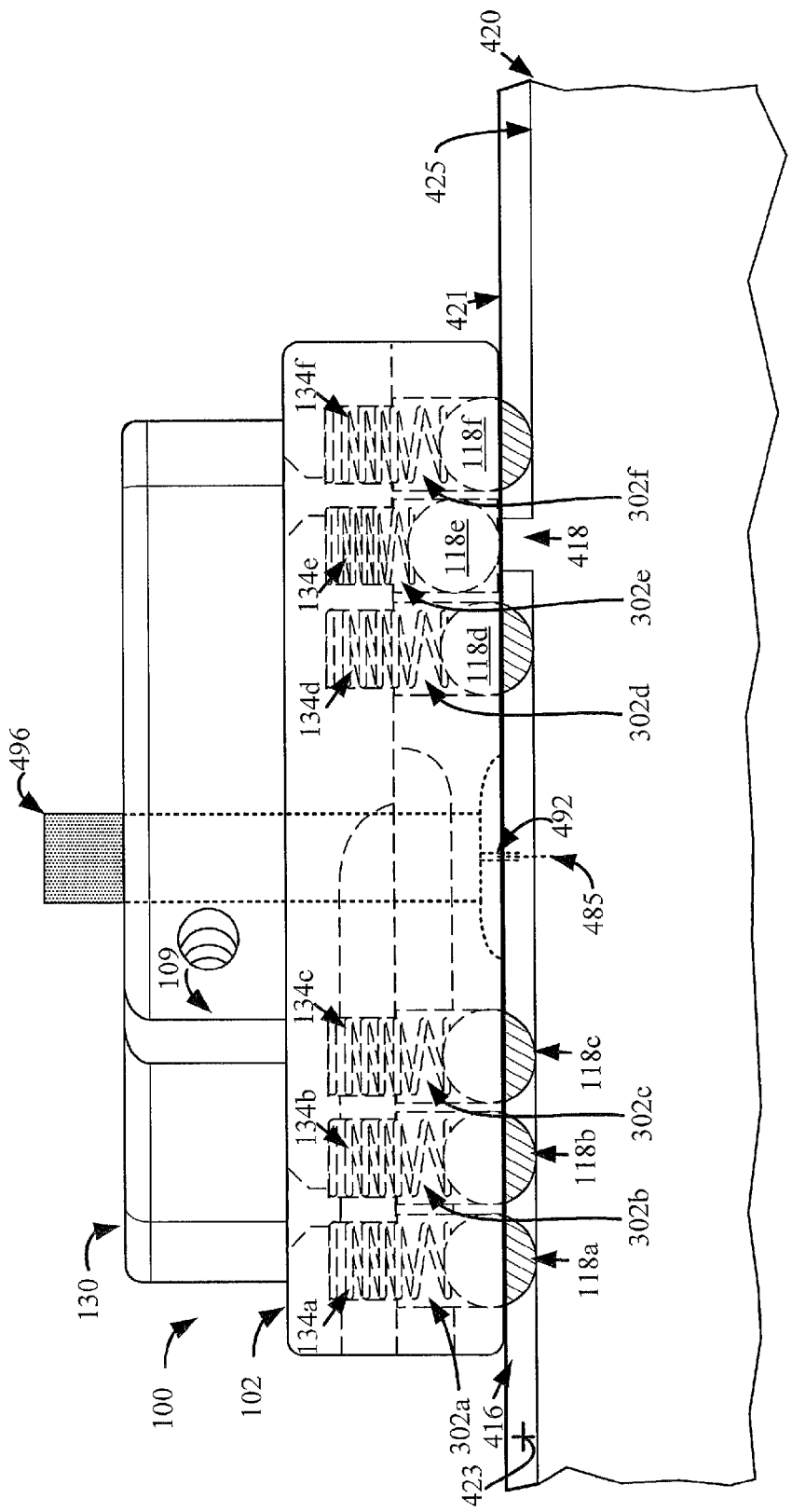
FIG. 4D illustrates a side view of the cutting guide of FIG. 1A disposed at a third cutting location on the workpiece of FIG. 4A.
Figure 4E:
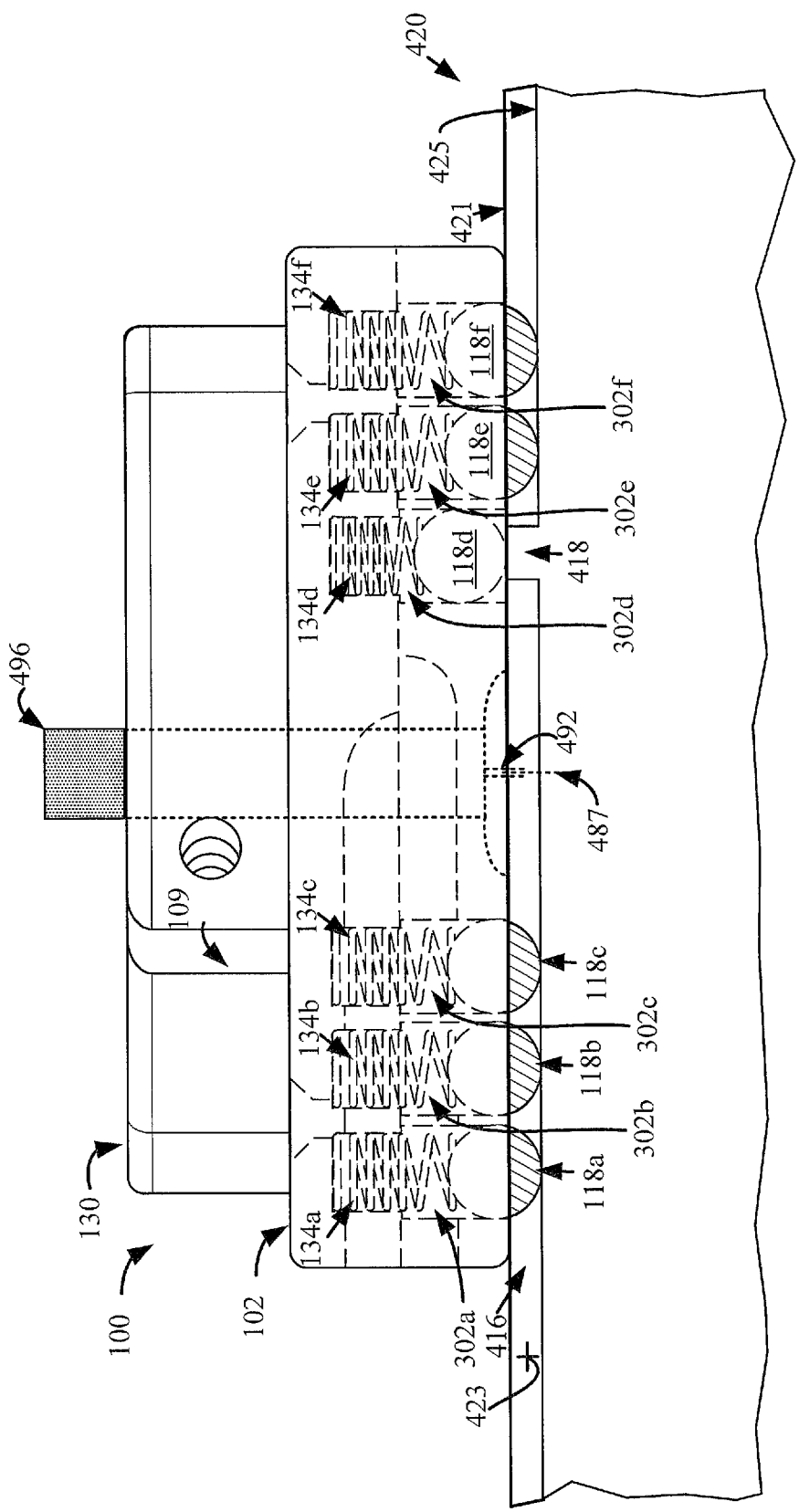
FIG. 4E illustrates a side view of the cutting guide of FIG. 1A disposed at a fourth cutting location on the workpiece of FIG. 4A.

FIG. 4A illustrates a top view of the cutting guide 100 of FIGS. 1A and 1B and the first cutter 496 and the second cutter 498 while the cutting guide 100 is located on the workpiece 420 at a first location (e.g., at a first cutting location). FIG. 4B illustrates a side view (with the base 102 transparent) of the cutting guide 100 of FIG. 1A and the first cutter 496 while the cutting guide 100 is positioned on the workpiece 420 (which is illustrated in FIG. 4B as a cross-sectional view along line A of FIG. 4A) at the first location of FIG. 4A (e.g., at a first cutting location 482). FIG. 4C illustrates a side view (with the base 102 transparent) of the cutting guide 100 of FIG. 1A and the first cutter 496 while the cutting guide 100 is positioned on the workpiece 420 (which is illustrated in FIG. 4C as a cross-sectional view along line A of FIG. 4A) at a second location (e.g., at a second cutting location 483) of the workpiece 420. FIG. 4D illustrates a side view (with the base 102 transparent) of the cutting guide 100 of FIG. 1A and the first cutter 496 while the cutting guide 100 is positioned on the workpiece 420 (which is illustrated in FIG. 4C as a cross-sectional view along line A of FIG. 4A) at a third location (e.g., at a third cutting location 485) of the workpiece 420. FIG. 4E illustrates a side view of the cutting guide 100 (with the base 102 transparent) of FIG. 1A and the first cutter 496 while the cutting guide 100 is positioned on the workpiece 420 (which is illustrated in FIG. 4D as a cross-sectional view along line A of FIG. 4A) at a fourth location (e.g., at a fourth cutting location 487) of the workpiece 420.

At the first location 482 of FIG. 4B, each roller of the plurality of retractable rollers 118a, 118b, 118c, 118d, 118e, and 118f is at least partially disposed within the groove 416 and is in an un-retracted state. In some examples, each roller of the plurality of retractable rollers 118a, 118b, 118c, 118d, 118e, and 118f is in contact with the surface 425 of the groove 416. In these examples, the spherical nature of the plurality of retractable rollers 118a, 118b, 118c, 118d, 118e, and 118f enables the plurality of rollers 118a, 118b, 118c, 118d, 118e, and 118f to roll along the surface 425, thereby reducing or limiting friction between the surface 425 and the plurality of retractable rollers 118a, 118b, 118c, 118d, 118e, and 118f. Each roller of the plurality of retractable rollers 118a, 118b, 118c, 118d, 118e, and 118f is in contact with a corner defined by the surface 423 and the surface 421 and is in contact with a corner defined by the surface 499 and the surface 421. Because the springs provide a compression force opposing retraction of the plurality of retractable rollers 118a, 118b, 118c, 118d, 118e, and 118f, the plurality of retractable rollers 118a, 118b, 118c, 118d, 118e, and 118f may resist moving out of the groove 416, thereby limiting movement of the cutting guide 100 in a direction 433 or a direction 435. Therefore, the plurality of retractable rollers 118a, 118b, 118c, 118d, 118e, and 118f disposed within the groove 416 interact with the groove 416 to resist movement of the cutting guide 100 in directions other than the direction 430. Thus, at the first location 482, each roller of the plurality of retractable rollers 118a, 118b, 118c, 118d, 118e, and 118f is interacting with the workpiece 420 to provide directional guidance to the cutting guide 100 along the direction 430. Additionally, the surface 120 is in contact with a surface 421 of the workpiece 420.

At the second location 483 of FIG. 4C, the retractable rollers 118a, 118b, 118c, 118d, and 118e are at least partially disposed within the groove 416 and are in an un-retracted state, and the roller 118f (e.g., a first roller) is in a retracted state responsive to encountering a contour change (e.g., a step or a bump) 418. The contour change 418 may correspond to a termination of the groove 416 or a reduction in a dimension of the groove 416 relative to other portions of the groove 416. At the second location 483, the retractable rollers 118a, 118b, 118c, 118d, and 118e interact (e.g., are in contact) with the workpiece 420 in a manner that resists or opposes movement of the cutting guide 100 outside of the groove 416 (e.g., in the direction 433 or the direction 435) as described above with reference to FIG. 4B, thereby serving to guide the cutting guide 100 along the direction 430. Additionally, because the roller 118f retracted in response to encountering the contour change 418, the surface 120 is in contact with the surface 421 of the workpiece 420 at the second location 483 despite encountering the contour change 418.

At the third location 485 of FIG. 4D, the rollers 118a, 118b, 118c, 118d, and 118f are at least partially disposed within the groove 416 and are in an un-retracted state, and the roller 118e (e.g., a second roller) is in a retracted state responsive to encountering the contour change 418. At the third location 485, the retractable rollers 118a, 118b, 118c, 118d, and 118f interact (e.g., are in contact) with the workpiece 420 in a manner that resists or opposes movement of the cutting guide 100 outside of the groove 416 (e.g., in the direction 433 or the direction 435) as described above with reference to FIG. 4B, thereby serving to guide the cutting guide 100 along the direction 430. Additionally, because the roller 118e retracted in response to encountering the contour change 418, the surface 120 is in contact with the surface 421 of the workpiece 420 at the third location 485 despite encountering the contour change 418, At the fourth location 487 of FIG. 4E, the retractable rollers 118a, 118b, 118c, 118e, and 118f are at least partially disposed within the groove 416 and are in an un-retracted state, and the roller 118d (e.g., a third roller) is in a retracted state responsive to encountering the step 418. At the fourth location 487, the rollers 118a, 118b, 118c, 118e, and 118f interact (e.g., are in contact) with the workpiece 420 in a manner that resists or opposes movement of the cutting guide 100 outside of the groove 416 (e.g., in the direction 433 or the direction 435) as described above with reference to FIG. 4B, thereby serving to guide the cutting guide 100 along the direction 430. Additionally, because the roller 118d retracted in response to encountering the contour change 418, the surface 120 is in contact with the surface 421 of the workpiece 420 at the fourth location 487 despite encountering the contour change 418, In the example illustrated in FIGS. 1A-1F, the cutting guide 100 additionally includes a second plurality of retractable rollers (e.g., a second plurality of substantially aligned retractable rollers) 119a, 119b, 119c, 119d, 119e, and 119f linearly arranged along a line (e.g., along a line 177 of FIG. 1E) substantially parallel to a line (e.g., the line 179) along which the plurality of retractable rollers 118a, 118b, 118c, 118d, 118e, and 118f is arranged. In some examples, the through-hole 184 may be located between at least two rollers of the second plurality of retractable rollers 119a, 119b, 119c, 119d, 119e, and 119f. For example, the portion 186 of the through-hole 184 is located between the roller 119d and the roller 119c. The second plurality of retractable rollers 119a, 119b, 119c, 119d, 119e, and 119f may be configured and may operate as described above with reference to the plurality of retractable rollers 118a, 118b, 118c, 118d, 118e, and 118f. For example, the second plurality of retractable rollers 119a, 119b, 119c, 119d, 119e, and 119f may be exposed to compression force from springs 121a, 121b, 121c, 121d, 121e, and 121f and may be disposed within recesses as described above with reference to the recesses 302a, 302b, 302c, 302d, 302e and 302f. During operation, the second plurality of retractable rollers 119a, 119b, 119c, 119d, 119e, and 119f may be configured to interact with a groove or channel parallel to the groove 416. For example, the second plurality of retractable rollers 119a, 119b, 119c, 119d, 119e, and 119f may be configured to interact with the groove 422 of FIG. 4A and may independently retract upon encountering a step 424 as described above with reference to the plurality of retractable rollers 118a, 118b, 118c, 118d, 118e, and 118f and the step 418.

Thus, each roller of the plurality of retractable rollers 118a, 118b, 118c, 118d, 118e, and 118f and the second plurality of retractable rollers 119a, 119b, 119c, 119d, 119e, and 119f is independently retractable. The independent nature of the retractability enables individual rollers to retract in response to contour changes in the workpiece (enabling the surface 421 to maintain contact with the surface 120) while other rollers maintain interaction with a groove or channel in the workpiece (providing directional guidance to the cutting guide).

The cutting guide 100 also includes a pressure manifold apparatus 130 coupled to the base 102. The pressure manifold apparatus 130 includes, defines, and/or is configured to function as a pressure manifold. The pressure manifold includes an input port to receive pressurized working fluid, such as air, and an output port to output pressurized working fluid. During operation, pressurized working fluid may be provided to the input port, the pressurized working fluid may be provided to the output port, the pressurized working fluid may be routed from the output port to one or more pneumatic cutter motors.

Figure 5:
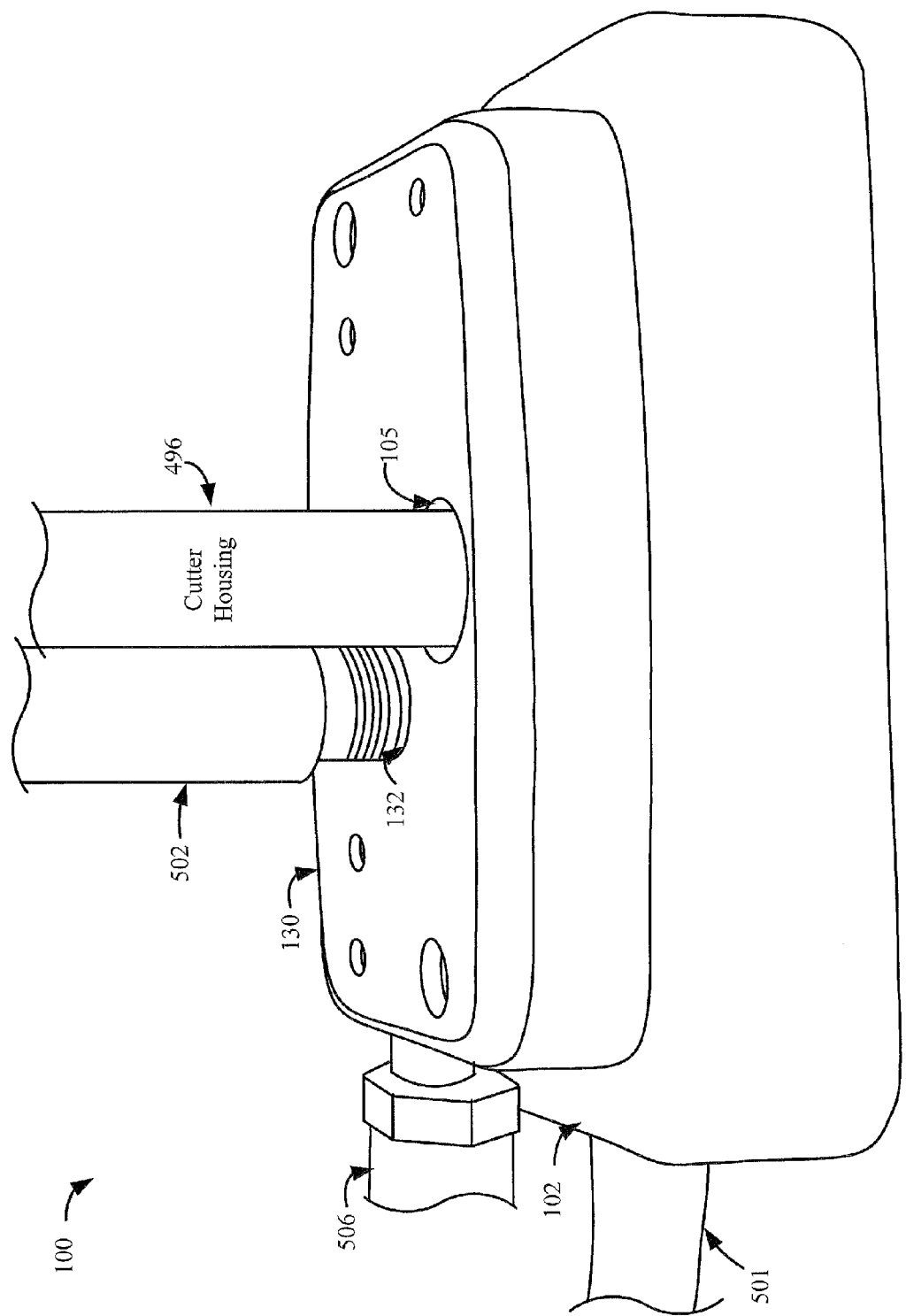
FIG. 5 illustrates a side perspective view of the cutting guide of FIG. 1A having a cutter secured thereto and coupled to a supply line, a vacuum line, and a routing line.

For example, FIG. 5 illustrates the cutting guide 100 of FIG. 1A having a cutter (e.g., a router cutter) 504 secured thereto and coupled to a vacuum line (e.g., vacuum hose) 501, to a supply line 502, and to a routing line (e.g., a hose) 506. The cutter 504 may be disposed in the through-hole 104 of FIG. 1A and a through-hole 105 that extends through the pressure manifold apparatus 130. The cutter 504 may be secured to the cutting guide 100 by clamping the through-hole 105 around a housing of the cutter 504. For example, the cutter 504 may be inserted in the through-hole 104 and the through-hole 105 and a screw may be inserted and screwed into a hole 109 and a threaded hole 111 (of FIG. 1B) to at least partially close a gap 107, causing the through-hole 105 to clamp around the cutter 504 housing, thereby securing the cutter 504 in position.

The supply line 502 may be coupled to an input port 132 of FIG. 1A. The supply line 502 may route pressurized air from a pressurized air source to the input port 132 of FIG. 1A. In some examples, the supply line 502 includes an actuator (e.g., an air gun handle) that routes pressurized air to the input port 132 responsive to manual input (e.g., manually depressing a trigger of the air gun). The input port 132 of FIG. 1A routes the input pressurized air to output port 172 of FIG. 1A, which is coupled to the line 506. The line 506 may provide the pressurized air to a manifold [not illustrated] coupled to the router motor of the cutter 504, thereby actuating the cutter 504.

Although the pressure manifold apparatus 130 is illustrated as including the input port 132 and the output port 172, in other implementations the pressure manifold apparatus 130 may include more than or less than two ports to route pressurized working fluid to the cutter 504. Additionally, the cutter 504 may include a different type of cutter, such as an electric, plasma, etc. cutter (in which case the cutting guide 100 may not include the pressure manifold apparatus 130).

In some examples, during operation, the cutting guide may be manually propelled. For example, during operation, an operator may apply force to the actuator (e.g., the air gun handle) to move the cutting guide. Thus, the cutting guide 100 may serve as a guide for a handheld cutting tool to generate cuts in a workpiece. The cutting guide 100 is configured to accommodate contour changes in the workpiece using retractable rollers as described above. The cutting guide 100 is additionally configured to vacuum cutting by-products through recessed vacuum ports located proximate to the cutting element of the cutting tool. Additionally, the cutting guide 100 can accommodate one or multiple cutters.

Figure 6:
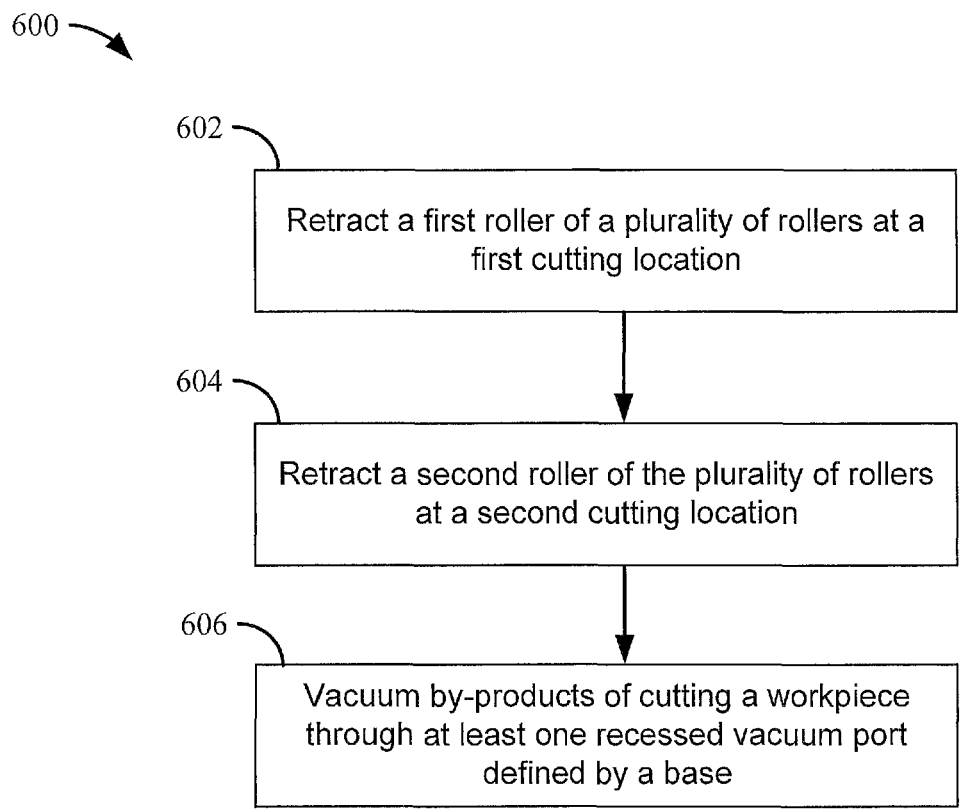
FIG. 6 is a flow chart of a particular example of a method of cutting using the cutting guide of FIG. 1A.

FIG. 6 illustrates a method 600 of cutting a workpiece. The method may be performed during movement of a cutting guide that includes a base defining at least one through-hole configured to receive a cutter and includes a plurality of substantially aligned individually retractable rollers that are retractable in a direction normal to a surface of the base. For example, the method 600 may be performed during movement of the cutting guide 100 of FIG. 1A. The workpiece may correspond to the workpiece 420 described above with reference to FIG. 4A. The through-hole may correspond to the through-hole 104 of FIGS. 1E, 2A, and 2B. The plurality of substantially aligned individually retractable rollers may correspond to the plurality of retractable rollers 118a, 118b, 118c, 118d, 118e, and 118f. The movement of the cutting guide 100 may be in a direction parallel to a linear arrangement of the plurality of rollers. For example, the cutting guide 100 may move in a direction parallel to the linear arrangement of the plurality of retractable rollers 118a, 118b, 118c, 118d, 118e, and 118f, such as the direction 430 described above with reference to FIG. 4A.

The method 600 includes, at 602, retracting a first roller of the plurality of retractable rollers at a first cutting location. For example, the first roller may correspond to the roller 118f and the first location may correspond to the second location of FIG. 4C. In this example, the roller 118f is retracted while the remaining retractable rollers 118a, 118b, 118c, 118d, and 118e are unretracted. As described above, the first roller 118f may be substantially aligned with the rollers 118a, 118b, 118c, 118d, and 118e. Thus, at least one roller (e.g., the roller 118f) is retracted while at least one other roller (e.g., the retractable rollers 118a, 118b, 118c, 118d, and 118e) is partially disposed within a groove or channel (e.g., the groove 416) of the workpiece (e.g., the workpiece 420).

The method 600 includes, at 604, retracting a second roller of the plurality of retractable rollers at a second cutting location. For example, the second roller may correspond to the roller 118e and the second location may correspond to the third location of FIG. 4D. In this example, the roller 118e is retracted while the remaining rollers 118a, 118b, 118c, 118d, and 118f are unretracted. Thus, at least one roller (e.g., the roller 118e) is retracted while at least one other roller (e.g., the retractable rollers 118a, 118b, 118c, 118d, and 118f) is partially disposed within a groove or channel (e.g., the groove 416) of the workpiece (e.g., the workpiece 420).

The independent nature of the retractability enables individual rollers to retract in response to contour changes in the workpiece (enabling the surface 421 to maintain contact with the surface 120) while other rollers maintain interaction with a groove or channel in the workpiece (providing directional guidance to the cutting guide as described above with reference to FIGS. 4A-E). Thus, the cutting guide maintains contact with the workpiece and provides directional guidance via interaction with grooves or channels in the workpiece despite encountering contour changes in the workpiece.

During movement of the base, the cutter cuts the workpiece. For example, the cutter may correspond to the cutter 496 described above with reference to FIGS. 4A-4E and 5, and the cutter 496 may cut the workpiece 420 of FIG. 4A to generate the cut 426. Additionally or alternatively, a second cutter may be disposed in the cutting guide, and the second cutter may cut the workpiece 420 to generate the cut 428. For example, the second cutter may correspond to the cutter 498 of FIGS. 4A-4E.

The method 600 includes, at 606, vacuuming by-products resulting from cutting the workpiece through at least one recessed vacuum port defined by the base. The at least one recessed vacuum port may correspond to one or more of the plurality of ports 110a, 110b, 110c, 110d, 110e, and 110f. The by-products may be vacuumed through the at least one recessed vacuum port as described above with reference to FIGS. 1A, 1E, and 5. For example, the by-products may be vacuumed through the plurality of ports 110a, 110b, 110c, 110d, 110e, and 110f into the routing port 114 connected (e.g., via the manifold portion 112) to the plurality of ports 110a, 110b, 110c, 110d, 110e, and 110f and out of the base.

The illustrations of the examples described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. As the following claims reflect, the claimed subject matter may be directed to less than all of the features of any of the disclosed examples.

Examples described above illustrate but do not limit the disclosure. It should also be understood that numerous modifications and variations are possible in accordance with the principles of the present disclosure. Accordingly, the scope of the disclosure is defined by the following claims and their equivalents.

What is claimed is:

1. An apparatus comprising:
    a base defining multiple through-holes, each through-hole configured to receive a cutter; and
    a plurality of substantially aligned retractable rollers disposed at least partially within a plurality of recesses of the base, wherein each roller of the plurality of substantially aligned retractable rollers is retractable in a direction normal to a surface of the base.

2. The apparatus of claim 1, wherein the base further comprises at least one recessed vacuum port.

3. The apparatus of claim 1, wherein each recess of the plurality of recesses includes a first portion that is dimensioned to receive a roller of the plurality of substantially aligned retractable rollers.

4. The apparatus of claim 1, wherein each recess of the plurality of recesses includes a tapered portion that has a cross section smaller than a cross section of each roller of the plurality of substantially aligned retractable rollers such that only a portion of the roller is able to pass through the tapered portion.

5. The apparatus of claim 1, further comprising a second plurality of substantially aligned retractable rollers parallel to the plurality of substantially aligned retractable rollers, wherein the multiple through-holes include a first through-hole and a second through-holes, wherein the first through-hole is located between at least two rollers of the plurality of substantially aligned retractable rollers and wherein the second through-hole is located between at least two rollers of the second plurality of substantially aligned retractable rollers.

6. The apparatus of claim 1, wherein the plurality of substantially aligned retractable rollers includes at least three rollers.

7. The apparatus of claim 1, wherein each roller of the plurality of substantially aligned retractable rollers is spherical.

8. The apparatus of claim 1, further comprising a second plurality of substantially aligned retractable rollers linearly arranged along a line substantially parallel to a line along which the plurality of substantially aligned retractable rollers is arranged.

9. The apparatus of claim 1, wherein a surface of the base is configured to contact a surface of a workpiece, and wherein the surface of the base is formed of material having a low coefficient of friction.

10. The apparatus of claim 9, wherein the surface of the base is formed of polyethylene.

11. A method comprising:
    during movement of a cutting guide that includes a base defining multiple through-holes, each through-hole configured to receive a cutter, and that includes a plurality of substantially aligned independently retractable rollers retractable in a direction normal to a surface of the base:
        retracting a first roller of the plurality of substantially aligned independently retractable rollers at a first cutting location; and
        retracting a second roller of the plurality of substantially aligned independently retractable rollers at a second cutting location.

12. The method of claim 11, wherein the cutter cuts a workpiece during movement of the base, and further comprising vacuuming by-products that result from cutting the workpiece through at least one recessed vacuum port defined by the base.

13. The method of claim 12, wherein vacuuming the by-products includes vacuuming the by-products through the at least one recessed vacuum port into a routing port coupled to the at least one recessed vacuum port.

14. The method of claim 11, wherein the first roller is retracted while at least one other roller of the plurality of substantially aligned independently retractable rollers is partially disposed within a groove of a workpiece.

15. The method of claim 11, wherein the movement of the cutting guide is in a direction that is parallel to the plurality of substantially aligned independently retractable rollers.

16. A cutting guide comprising:
- a base including a vacuum manifold, the base defining multiple through-holes, wherein each through-hole is configured to receive a cutter; and
- a plurality of substantially aligned retractable rollers disposed at least partially within recesses of the base, each roller of the plurality of substantially aligned retractable rollers retractable in a direction normal to a surface of the base.

17. The cutting guide of claim 16, routing port coupled to a plurality of recessed vacuum ports, and wherein each of the plurality of recessed vacuum ports is configured to receive cutting by-products.

18. The cutting guide of claim 16, wherein a particular through-hole of the multiple through-holes is located between at least two rollers of the plurality of substantially aligned retractable rollers.

19. The cutting guide of claim 16, further comprising a second plurality of substantially aligned retractable rollers that are parallel to the plurality of substantially aligned retractable rollers.

20. The cutting guide of claim 19, wherein the multiple through-holes include a first through-hole and a second through-hole, wherein the first through-hole is located between at least two rollers of the plurality of substantially aligned retractable rollers and wherein the second through-hole is located between at least two rollers of the second plurality of substantially aligned retractable rollers.

\* \* \* \* \*